United States Patent Office 3,510,532 Patented May 5, 1970

3,510,532
HALOGENATION OF AN ACYCLIC OLEFIN

Frank E. Caropreso, Hamilton Square, and Clarence D. Chang, Princeton, N.J., John H. Craddock, Creve Coeur, Mo., and Marshall L. Spector, Livingston, N.J., assignors to Pullman Incorporated, New York, N.Y., a corporation of Delaware No Drawing. Continuation-in-part of application Ser. No. 304,953, Aug. 27, 1963. This application July 15, 1966, Ser. No. 565,402
Int. Cl. C07c *17/02, 17/04*
U.S. Cl. 260—658 10 Claims This invention relates to the preparation of a metal halide catalyst for the halogenation of an olefinic halogen substituted or unsubstituted hydrocarbon. In one aspect, the invention relates to the preparation of metal halide catalyst mixture for the oxidation of hydrogen halide in the oxidative halogenation of an olefin. Still another aspect of this invention relates to an improved process for the halogenation of a hydrocarbon.

The present application is a continuation-in-part of Ser. No. 304,953, filed Aug. 27, 1963, now abandoned, in the names of Frank E. Caropreso, Clarence D. Chang, John H. Craddock and Marshall L. Spector.

The halogenation of olefinic hydrocarbons with oxygen or air and a hydrogen halide in the presence of a metal halide catalyst is a process of primary importance in the commercial production of halogenated hydrocarbons of both saturated and unsaturated types. The catalyst heretofore employed in these halogenation processes is most usually a solid halide or an oxyhalide of a metal having a variable valence. As employed in these reactions, the catalysts are usually deposited on solid carriers such as pumice, various natural clays, kieselguhr, alumina or silica or any other attrition-resistant carrier material and the solid mass is employed in the chlorination of hydrocarbons, either in a fixed or moving bed or in a fluidized state in a reaction zone.

The commercial success of these processes is due largely to the demand for halogenated compounds containing from 1 to 6 carbon atoms; however, there is a great need for improvement in these processes. For example, it would be highly desirable to reduce the contact time normally associated with fixed bed operation, while eliminating the difficulties associated with fluidized solid operation such as catalyst attrition and catalyst vaporization which appears to be more pronounced with highly active catalysts. While the moving bed solves some of these difficulties, it is not without its own particular problems such as those resulting from the mechanical transportation of catalyst throughout a zone and the existence of "hot spots" in the catalyst bed. The heat of reaction generated on the surface of the solid permits direct oxidation of the hydrocarbon to produce undesirable oxides of carbon.

The more active metal halide catalysts, such as, for example, copper chloride, are more volatile at required halogenation temperatures and thus, it has been difficult to retain the catalyst in the system while maintaining the activity of the solid catalyst mass over an extended period of time. In such systems the volatilized catalyst must be recovered by condensation or other troublesome methods and returned in a supported condition to the reaction zone. Thus, the economics of operating with fluidized catalyst is poor in spite of the fact that such a system provides better temperature control and higher yield of product for a given period of operation.

Several processes have reported contacting a gaseous mixture containing ethylene with a liquid mixture of metal chlorides (e.g., U.S. Pat. No. 2,809,221 and U.S. Pat. No. 2,779,805). However, these processes have failed to convert any of the ethylene to halogenated ethane. It has also been found that with liquid catalyst systems, frothing occurs during reaction in which solids are precipitated. The resulting catalyst loss lowers the productivity of the reactor and in most cases necessitates reactor shutdown.

It is, therefore, an object of the present invention to overcome the above diculties involved in the use of solid catalyst systems by providing novel economic and commercially feasible catalyst composition suitable for the halogenation of olefins.

Another object of the present invention is to minimize the loss of metal halide catalyst due to volatilization in a halogenation reaction.

Another object of the invention is to provide a process for the halogenation of an ethylenic hydrocarbon to the 1,2-dihalo-derivative in about 99 percent selectivity.

Another object of the invention is to provide a process for the chlorination of olefinic hydrocarbons wherein an improved contact between hydrocarbon and catalyst is realized.

Another object of this invention is to provide a process for the halogenation of a hydrocarbon wherein good temperature control is maintained in the reaction zone.

Another object is to provide for the halogenation of an olefin to the 1,2-dihaloparaffin derivative in high selectivity and yield.

Still another object of this invention is to provide an halogenation of a hydrocarbon at a relatively low temperature.

Another object is to provide an improved halogenation catalyst system for markedly increasing the space time yield of an olefin to the corresponding haloparaffin.

Another object is to avoid oxidation of hydrocarbons during halogenation in the presence of oxygen, a hydrogen halide and a metal halide halogenating agent.

Still another object of this invention is to provide an improved metal halide catalyst composition which can be readily regenerated and reused in the chlorination of hydrocarbons.

These and other objects of the present invention will become apparent to those skilled in the art from the accompanying description and disclosure.

According to the present invention, a marked improvement in the halogenation of an acyclic olefin to the corresponding halo-paraffin is effected by employing a three-component catalyst system in aqueous solution. The catalyst system of the present invention comprises, as the active portion, cupric halide; as the promoter portion, cuprous halide; and as the solubilizing portion, a halide selected from the group consisting of lithium, magnesium and calcium, and mixtures thereof wherein the halogen equivalent ratio of the metal halide solubilizing portion as compared with cuprous halide is at least 2:1, preferably between 2:1 and 6:1. The halogenation of the olefin is carried out at a temperature between about 120° C. and about 350° C. under pressure sufficient to maintain the catalyst in the liquid phase. Although pressures up to about 1000 p.s.i.g. or above can be employed, pressures within the range of from about 20 p.s.i.g. to about 500 p.s.i.g. have been found to be effective for this process.

For the purposes of this disclosure, the acyclic olefin reactants referred to herein are defined as those compounds which contain an atom of carbon doubly bonded to another carbon atom. These compounds can be hydrocarbon olefins containing only hydrogen and carbon or can be substituted to any degree by atoms or functional groups hereinafter described.

The olefins preferably employed in the process of the present invention include those which contain at least one hydrogen atom on each of two adjacent carbon atoms and which can be otherwise substituted with hydrogen and/or halogen atoms. Examples of such olefinic compounds include ethylene, propylene, the isomeric butylenes, butadiene, isoprene, vinyl chloride, monochlorobutadiene, monochloroisoprene, dichloroethylene, trichloroethylene, and the corresponding brominated or iodinated derivatives of these compounds. Perhalogenated olefins such as tetrachloroethylene can also be used in the present process. Preferred of this group, however, are ethylene, dichloroethylenes, trichloroethylene, and vinyl chloride.

Other olefinic compounds which can be subjected to halogenation in the process of the present invention are those which contain substituted functional groups such as the hydroxy group, the sulfide group, cyano groups, carboxyl groups, ester groups, ketone groups, ether groups, and epoxy groups on a carbon atom other than the olefinic carbon pair.

It is to be understood that the halogenation reactions referred to herein include chlorination, bromination and iodination; although, the most preferred reaction is that of chlorination. Accordingly, the halide catalysts of the present invention preferably comprise a mixture of metal chlorides.

In copending application Ser. No. 199,329, filed June 1, 1962, now U.S. Pat. No. 3,214,481, various catalyst systems are named which effect the conversion of ethylene to 1,2-dichloroethane with a high degree of selectivity. The catalysts of the present process retain this high degree of selectivity in the halogenation reaction, while at the same time markedly increase the conversion of the olefin to the halogenated product per pass as in a continuous operation. The mole percent conversion per pass of the olefin is increased over other processes by at least 25 percent and in some cases, an increase of 100 percent or higher is obtained when employing the three-component aqueous catalyst system of the present invention.

In the catalyst systems of the present invention, consisting of cupric halide-cuprous halide and one or more of the inorganic halide solubilizing agents, the total copper concentration can vary over a wide range, namely from about 5 to about 90 mole percent, preferably between about 10 and about 60 mole percent and the ratio of copper in the cupric form to copper in the cuprous form is between about 14:1 and about 1:2, preferably between about 4:1 and about 1:1. Although the halogen equivalent ratio of at least 2:1, solubilizing halide to cuprous halide, is critical, the solubilizing halide of the catalyst, with respect to the total catalyst composition, can vary over a wide range, namely from about 0.001 to about 90 mole percent to provide an operable system. However, above about 40 mole percent, the catalyst solution will generally contain some solids. Since it is preferred to operate the present process with a homogeneous catalyst solution, the preferred range of the solubilizing halide is between about 10 and about 40 mole percent. The concentration of the total halides in the catalyst system is between about 5 mole percent and about 50 mole percent preferably between about 10 mole percent and about 30 mole percent.

In the chlorination of an olefinic hydrocarbon, having from 2 to 10 carbon atoms, preferably from 2 to 6 carbon atoms in the presence of the three-component aqueous catalyst of the present process, the chlorination temperature is most preferably between about 125° C. and about 240° C. and the pressure employed is most preferably within the range of from 60 p.s.i.g. to about 500 p.s.i.g. The most preferred of the catalyst system employed in the present process is $CuCl_2$—$CuCl$—$CaCl_2$. It is also found that in bromination or iodination reactions, the corresponding bromide or iodide mixture of halide catalyst containing $CaBr_2$ or $CaI_2$ is superior.

In the halogenation reaction of the present invention, it is preferred to maintain the catalyst solution in saturated condition with respect to olefin or as near to a saturated condition as is economically desirable under the conditions of operation. A flow rate of between about 1 to about 25 moles of olefin per hour per liter of catalyst has been found to provide superior operation. However, it is to be understood that rates of 100 moles of olefin per hour per liter of catalyst or higher, can be suitably employed, if desired.

During the course of the reaction, the cupric chloride attains a lower valence state by giving up chlorine atoms to the olefinic compound. When the concentration of the active catalyst portion falls below about 50 mole percent, preferably about 35 mole percent of the original cupric halide content in the solution, it is either removed from the reaction zone and regenerated, preferably with hydrogen chloride and oxygen or is regenerated within the reaction zone to restore the active cupric chloride content. In the latter case, the chlorination of the olefin is carried out with the cupric-cuprous-solubilizer solution or suspension simultaneously with the oxygen-hydrogen halide regeneration of cuprous halide to cupric halide.

In the chlorination of ethylene or vinyl chloride in the presence of an aqueous cupric-cuprous chloride-solubilizer solution at a temperature not in excess of 190° C., a high selectivity to 1,2-dichloroethane in the case of ethylene or 1,1,2-trichloroethane in the case of vinyl chloride at least as high as 98 mole percent based on chlorinated product is obtainable. The 1,2-dichloroethane is a valuable intermediate in the manufacture of vinyl chloride by pyrolysis of the saturated dichloride and the 1,1,2-trichloroethane is an intermediate in the preparation of vinylidene chloride by pyrolysis. Thus the process using the catalyst of the present invention at a temperature below 190° C. finds particular commercial value in the economical synthesis of these unsaturated chlorides and provides a new process wherein the hydrogen chloride produced by the pyrolysis of the saturated compounds can be used to regenerate, at least partially, the catalyst solution. It is to be understood that additional chlorine for regeneration purposes may be supplied as hydrogen chloride or chlorine. The hydrogen chloride concentration is limited to that required for regeneration in order to avoid excess hydrogen chloride being present which would lead to the formation of ethyl chloride in the case of ethylene chlorination unless ethyl chloride is the desired product of the process.

A major advantage of the present process which is realized by employing the critical excess of solubilizing halide on a halogen equivalent basis with respect to cuprous halide is that this or a higher excess of the solubilizing agent provides a solubilizing effect which avoids precipitation of cuprous chloride upon depletion of cupric chloride. It is essential to avoid frothing which leads to subsequent overflow of the catalyst from its container.

Another advantage of the present process employing the aqueous catalyst solutions is that an aqueous or dilute solution of hydrogen halide can be fed to the reaction zone in place of the dried, highly concentrated hydrogen halide employed heretofore. In the present process, excess water is vaporized from the reaction zone by the heat of reaction while a portion of that generated serves to maintain the water content of the liquid aqueous catalyst medium. It has also been found that with the catalyst solutions, little or no hydrogen halide is present in the gaseous reactor effluent.

The apparatus used where the aqueous metal halide catalyst solution is employed, should be composed of, or lined with, acid-resistant materials in order that the catalytic solution will not cause corrosion problems in the system. For example, glass or ceramic-lined equipment is suggested as being both inexpensive and readily available for this type of reaction. Tantalum can also be used as lining material for the reactor.

For a better understanding of the present invention, reference is now had to the following examples, which are not to be construed as in any way limiting to the scope of the invention and are presented only to illustrate specific embodiments of the process described herein or to provide comparative data which illustrates the superiority of the present catalyst systems over those of the prior art.

EXAMPLES 1 THROUGH 17

Examples 6 to 11 and 13 to 17 demonstrate the improvement on moles of dichloroethylene product per liter of solution per hour with the three-component catalyst systems of the present invention. Examples 1 and 2 have been reported in order to compare the improvement of the three-component catalyst systems set forth in the present invention with a two-component catalyst contact time per pass was about two seconds. In Examples 1 through 17 ethylene is chlorinated to 1,2-dichloroethane in separate glass lined metal reactors each containing one liter of the aqueous catalyst solution reported in Table I. Ethylene is introduced into each of these reactors at the reported flow rates and the reaction was allowed to take place under a total pressure of 300 p.s.i.g. Generally, it is preferred to maintain the partial pressure of the olefin above 150 p.s.i. and in each of the examples reported in Table I the partial pressure of ethylene is maintained above 165 p.s.i. The product selectivity to 1,2-dichloroethane in most of the examples is at least 99 percent, and in no case is it below 96 percent.

TABLE I.—CHLORINATION OF ETHYLENE TO 1,2-DICHLOROETHANE

| Example No.[1] | Catalyst Solution | | | Moles of $C_2H_4$/liter Soln./hr. | Mole percent Conversion/Pass | Moles of Product/liter of Soln/hr. | Initial Cl equivalent ratio Solubilizer: CuCl |
|---|---|---|---|---|---|---|---|
| | $CuCl_2$ | CuCl | Solubilizer | | | | |
| 1 | 6M | 2M | 0 | 6.2 | 4.8 | 0.30 | |
| 2 | 6M | 2M | 0 | 7.2 | 3.9 | 0.28 | |
| 3 | 6M | 2M | 2M NaCl | 6.6 | 6.4 | 0.42 | 1:1 |
| 4 | 6M | 2M | 1M $BaCl_2$ | 8.1 | 5.8 | 0.47 | 1:1 |
| 5 | 6M | 2M | 2M LiCl | 5.6 | 8.8 | 0.49 | 1:1 |
| 6 | 6M | 2M | 4M LiCl | 12.7 | 7.0 | 0.89 | 2:1 |
| 7 | 6M | 2M | 2M $MgCl_2$ | 8.3 | 7.4 | 0.61 | 2:1 |
| 8 | 6M | 2M | 2M $CaCl_2$ | 9.3 | 7.2 | 0.67 | 2:1 |
| 9 | 6M | 2M | 3.4M $CaCl_2$ | 7.4 | 11.9 | 0.88 | 3.4:1 |
| 10 | 6M | 2M | 3.4M $CaCl_2$ | 9.6 | 13.1 | 1.23 | 3.4:1 |
| 11 | 6M | 2M | 3M $CaCl_2$ | 9.0 | 20.4 | 1.83 | 3:1 |
| 12 | 6M | 2M | 1M $CaCl_2$ | 7.2 | 7.0 | 0.50 | 1:1 |
| 13 | 2.07M | 3.5M | 3.9M $CaCl_2$ | 40 | 7.6 | 2.98 | 2.2:1 |
| 14 | 3.11M | 1.64M | 3.47M $CaCl_2$ | 42 | 10.2 | 3.48 | 4.2:1 |
| 15 | 3.14M | 1.23M | 3.16M $CaCl_2$ | 44 | 7.9 | 2.81 | 5.1:1 |
| 16 | 2.63M | 3.02M | 4.09M $CaCl_2$ | 57 | 9.1 | 4.07 | 2.7:1 |
| 17 | 3.08M | 2.5M | 4.19M $CaCl_2$ | 56 | 7.8 | 4.24 | 3.3:1 |

[1] Examples 13 and 16 were carried out at 183° C.; Example 17 was carried out at 185° C.; Example 14 was run at 177.8° C. and Example 15 was run at 174° C.; all of the remaining Examples were carried out at 150° C.

system containing no solubilizing agent. It will be noted that in the chlorination of ethylene to 1,2-dichloroethane, more than double the moles of product per liter of solution per hour are obtainable in the three-component system containing the present solubilizers in the critical ratio as compared with the two-component system.

Examples 3 and 4 represent catalyst systems containing solubilizing agents other than those set forth in the present application and these examples are also set forth for the purpose of illustrating the superiority of the lithium-, magnesium-, and calcium-chloride-solubilized systems. In the case of Examples 3 and 4 it will be noted that the moles of dichloroethylene per liter of solution per hour are decreased with these solubilized systems as compared with catalyst solutions of the present invention.

The criticality of the halogen equivalent ratio of solubilizer to cuprous chloride is also demonstrated by comparing Examples 5 and 6 and Examples 11 and 12 where a 1:1 mole ratio of lithium chloride and calcium chloride solubilizer is compared to 2:1 and a 3:1 ratio of the same solubilizers. From Examples 5 and 6 and 11 and 12, it will be noted that the moles of product per liter of solution per hour have been approximately doubled or better by operating within the critical ratios of halogen equivalent.

In the examples reported in Table I, the mole percent conversions are reported on a per pass basis where the contact time per pass was about two seconds.

EXAMPLES 18 THROUGH 20

The following experiments were carried out to determine the effect of some other solubilizing halides on the rate of conversion of ethylene to 1,2-dichloroethane. In the following table (Table II in runs 18 through 20), three glass-lined metal reactors each containing 1 liter of an aqueous mixture of 6 molar $CuCl_2$, 2 molar CuCl and a 0.67 molar aqueous solution of the third metal halide was employed. These experiments also were conducted at a temperature of 150° C. under 300 p.s.i.g. for a period of 45 minutes and the product selectivity in each case was at least 99 percent to 1,2-dichloroethane. The results of these experiments are reported in the following table wherein it is shown, by comparison with Examples 1 and 2 and Examples 5 to 17 above, that the third metal halide added to provide the three-component catalyst system seemed to have either no effect or a deleterious effect on the rate and mole percent conversion to product.

TABLE II.—CHLORINATION OF ETHYLENE TO 1,2-DICHLOROETHANE

| Example No. | Catalyst Solution | | | Moles of $C_2H_4$/liter Soln./hr. | Mole Percent Conversion | Moles Product/liter Soln./hr. |
|---|---|---|---|---|---|---|
| | $CuCl_2$ | CuCl | Solubilizer | | | |
| 18 | 6M | 2M | 0.67M $AlCl_3$ | 6.6 | 3.2 | 0.21 |
| 19 | 6M | 2M | 0.67M Di*$Cl_3$ | 7.8 | 2.8 | 0.22 |
| 20 | 6M | 2M | 0.67M $CrCl_3$ | 7.0 | 4.4 | 0.31 |

*Didymium chloride.

EXAMPLES 21 THROUGH 24

In regard to Examples 21 through 23, an olefinic compound is added into three separate glass-lined metal reactors each containing 1 liter of an aqueous mixture of $CuCl_2$, CuCl and an aqueous solution of solubilizing inorganic halide as a three-component system as reported in the following table (Table III). Each of the experiments was carried out at a temperature of 175° C. under a total pressure of 250 p.s.i.g. for a period of 40 minutes. The results of these experiments are reported in the following Table III.

In regard to Example 24 also carried out in a glass-lined metal reactor, the temperature was maintained at 150° C. and a total pressure of 300 p.s.i.g. The partial pressure of ethylene in the reaction mixture was about 165 p.s.i.

TABLE III.—CHLORINATION OF OLEFINIC COMPOUNDS TO THE CORRESPONDING 1,2-CHLORO DERIVATIVE

| Example No. | Catalyst Solution | | | Moles of Olefin/ liter Soln./hr. | Mole Percent Conversion | Moles Product/liter Soln./hr. | Percent Selectivity |
|---|---|---|---|---|---|---|---|
| | $CuCl_2$ | CuCl | Solubilizer | | | | |
| 21 | 5M | 2M | 3M $CaCl_2$ | 4.0 $CH_2{=}CHCl$ | 7.0 | 0.28 | 99 to $CH_2Cl.CHCl_2$ |
| 22 | 5M | 2M | 3M $CaCl_2$ | 4.0 $CHCl{=}CHCl$ | 6.0 | 0.24 | 99 to $CHCl_2.CHCl_2$ |
| 23 | 5M | 2M | 3M $CaCl_2$ | 4.0 $CCl_2{=}CHCl$ | 4.0 | 0.16 | 98 to $CHCl_2.CCl_3$ |
| 24 | 6M | 2M | 3M $CaCl_2$ | 5.7 60% $C_2H_4$, 40% $C_2H_6$. | 9.1 | 0.31 | 99 of $C_2H_4$ to $CH_2Cl.CH_2Cl$ |

EXAMPLE 25

The following example illustrates the bromination of ethylene to 1,2-dibromoethane. This experiment is carried out at a temperature of 130° C. under a total pressure of 500 p.s.i.g. The result of this experiment is summarized in the following table (Table IV).

TABLE IV.—HALOGENATION OF ETHYLENE TO THE CORRESPONDING 1,2-DIHALO-ETHANE

| Example No. | Catalyst Solution | | | Moles of $C_2H_4$/ liter Soln./hr. | Mole percent Conversion | Moles Product/ liter Soln./hr. | Percent Selectivity |
|---|---|---|---|---|---|---|---|
| | $CuBr_2$ | CuBr | Solubilizer | | | | |
| 25 | 6M | 2M | 6M LiBr | 6.6 | 5.0 | 0.33 | 99 |

In all the examples above, illustrating the process of the present invention, the equivalent ratio of solubilizer to cuprous chloride, between about 2:1 and about 6:1, based on the chlorine, have been maintained. Other variations and modifications of the examples set forth above, which observe this critical ratio, are also within the scope of the present invention.

Having thus described our invention we claim:

1. A process for halogenating an acyclic olefin selected from the group consisting of a hydrocarbon olefin and a halogen substituted hydrocarbon olefin having from two to six carbon atoms which comprises contacting said olefin with an aqueous solution containing cupric halide, cuprous halide, and a metal halide solubilizing agent wherein the metal is selected from the group consisting of lithium, magnesium, calcium and mixtures thereof and wherein the halogen of the substituted olefin and the halogen of the halides in the aqueous solution are chlorine, bromine or iodine, the mole ratio of $Cu^{++}$ to $Cu^{+}$ is between about 14:1 and about 1:2; the halogen equivalent ratio of solubilizing halide to cuprous halide is at least 2:1; and halogenating the olefin with the aqueous solution under conditions such that the total copper concentration is maintained between about 6 and about 90 mole percent.

2. The process of claim 1 wherein the solubilizing agent is a calcium halide.

3. The process of claim 1 wherein the olefin is reacted at a temperature between about 120° C. and about 350° C. under a pressure sufficient to maintain the aqueous solution in the liquid phase.

4. The process of claim 3 wherein the mole ratio of $Cu^{++}$ to $Cu^{+}$ is between about 14:1 and about 1:2; the concentration of the solubilizing halide is between about 10 and about 40 mole percent; and the total copper concentration in the aqueous solution is between about 10 and about 60 mole percent.

5. The process of claim 4 wherein the catalyst is regenerated by a gas selected from the group consisting of hydrogen halide and oxygen or halogen or mixtures thereof.

6. The process of claim 5 wherein the hydrogen halide is an aqueous solution of hydrogen chloride.

7. The process for chlorinating an acyclic olefin selected from the group consisting of a hydrocarbon olefin and a chlorine substituted hydrocarbon olefin containing from two to six carbon atoms which comprises contacting said olefin with an aqueous solution containing cupric chloride, cuprous chloride, and a metal chloride solubilizing agent wherein the metal is selected from the group consisting of lithium, magnesium, calcium, and mixtures thereof; the chlorine equivalent ratio of the metal chloride solubilizing agent to cuprous chloride is between about 2:1 and about 6:1, the mole ratio of $Cu^{++}$ to $Cu^{+}$ is between about 4:1 and about 1:1; the total copper concentration in the aqueous solution is between about 6 and about 60 mole percent; and the reaction between the olefin and the aqueous solution is carried out at a temperature between 125° C. and 190° C. under a pressure sufficient to maintain the aqueous solution in the liquid phase.

8. The process of claim 7 wherein the olefin is ethylene.

9. The process of claim 7 wherein the olefin is vinyl chloride.

10. The process for brominating an acyclic olefin selected from the group consisting of a hydrocarbon olefin and a bromine substituted hydrocarbon olefin containing from two to six carbon atoms which comprises contacting said olefin with an aqueous solution containing cupric bromide, cuprous bromide and a metal bromide solubilizing agent wherein the metal is selected from the group consisting of lithium, magnesium, calcium, and mixtures thereof and wherein the bromine equivalent ratio of metal bromide solubilizing agent to cuprous bromide is between about 2:1 and about 6:1; the mole ratio of $Cu^{++}$ to $Cu^{+}$ is between about 4:1 and about 1:1; the total copper concentration in the aqueous solution is between about 6 and about 60 mole percent and the bromination is carried out at a temperature between about 120° C. and about 350° C. under a pressure sufficient to maintain the aqueous solution in the liquid phase.

References Cited

UNITED STATES PATENTS

| | | | |
|---|---|---|---|
| 2,399,488 | 4/1946 | Hearne | 260—658 |
| 2,809,221 | 10/1957 | Thomas et al. | |
| 2,915,565 | 12/1959 | Jacobowsky et al. | 260—654 |
| 3,214,481 | 10/1965 | Heinemann et al. | |

DANIEL D. HORWITZ, Primary Examiner

U.S. Cl. X.R.

252—441; 260—633, 609, 465.7, 539, 487, 593, 614, 348